United States Patent [19]

McLeod, Jr.

[11] 3,987,442

[45] Oct. 19, 1976

[54] DIGITAL MTI RADAR SYSTEM

[75] Inventor: Willard W. McLeod, Jr., Lexington, Mass.

[73] Assignee: Raytheon Company, Lexington, Mass.

[22] Filed: June 24, 1974

[21] Appl. No.: 482,814

[52] U.S. Cl. ............................... 343/7.7; 343/5 DP
[51] Int. Cl.² ........................................... G01S 9/42
[58] Field of Search ........................ 343/5 DP, 7.7

[56] References Cited
UNITED STATES PATENTS

| 3,706,989 | 12/1972 | Taylor, Jr. .................... 343/7.7 X |
| 3,725,923 | 4/1973 | Bosc et al. ...................... 343/7.7 |
| 3,742,500 | 6/1973 | Freedman ...................... 343/7.7 |
| 3,787,849 | 1/1974 | Sletten et al. ................... 343/7.7 |
| 3,852,742 | 12/1974 | Fletcher, Jr. et al. ............ 343/7.7 |

*Primary Examiner*—T.H. Tubbesing
*Attorney, Agent, or Firm*—Richard M. Sharkansky; Philip J. McFarland; Joseph D. Pannone

[57] ABSTRACT

A digital MTI radar system is disclosed which is adapted to reject moving clutter returns and to pass, for detection and display, returns from moving targets. The radar system includes means for producing a series of complex digital words representative of the average moving clutter Doppler velocity at each one of a series of range cells. A canceller network is provided to modify the returns from a range sweep with the complex digital words and to combine such modified returns with the returns of a successive range sweep, thereby to effectuate the desired moving clutter rejection.

4 Claims, 14 Drawing Figures

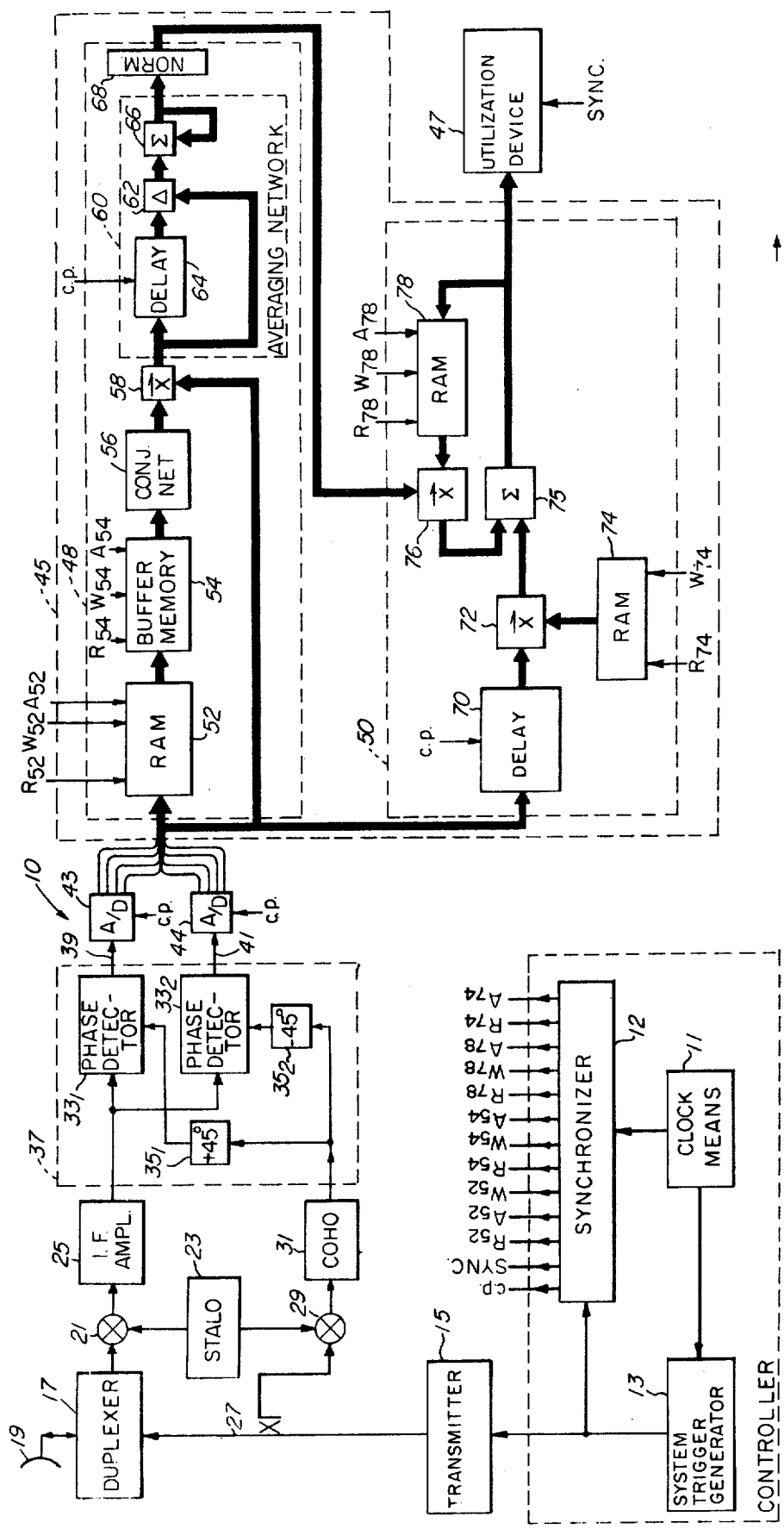
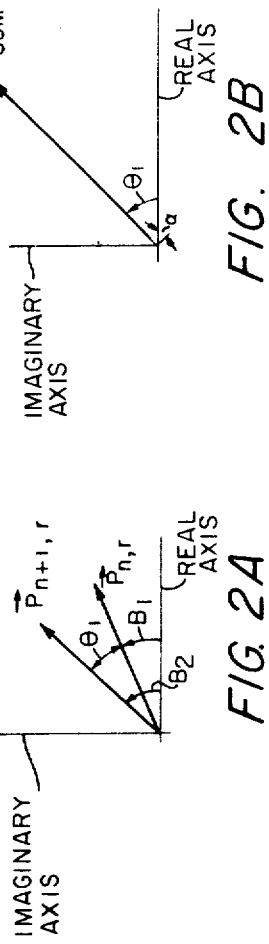
FIG. 1
FIG. 2A
FIG. 2B

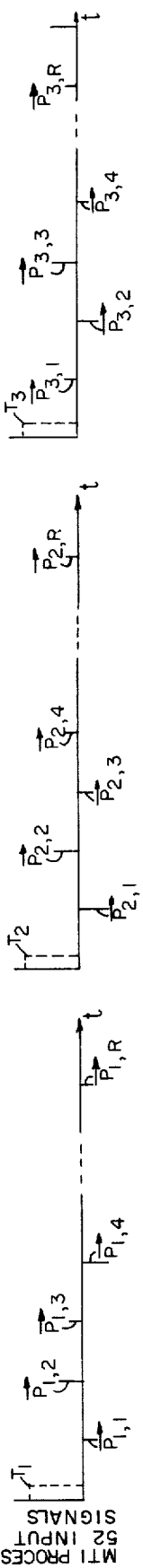
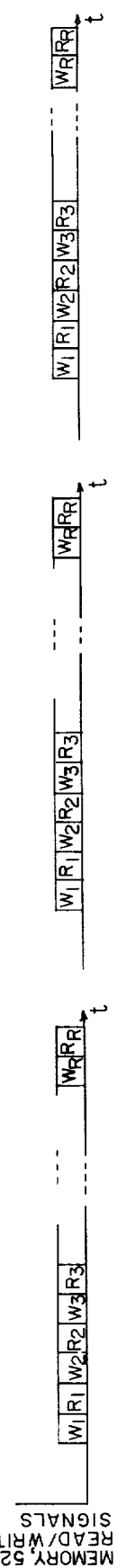
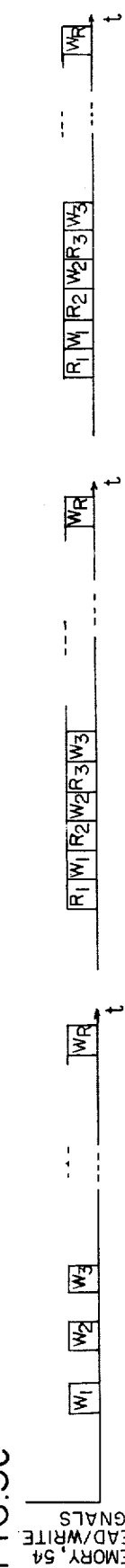
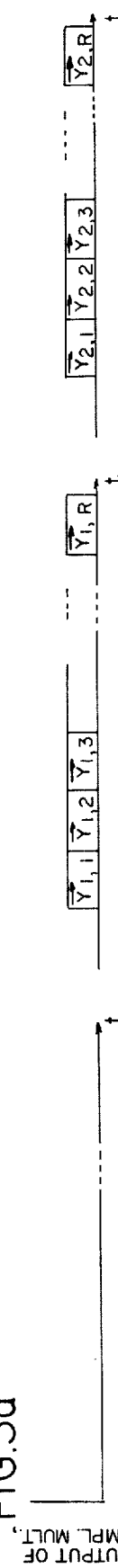
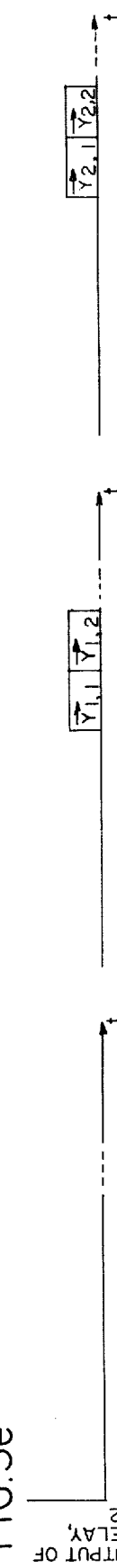
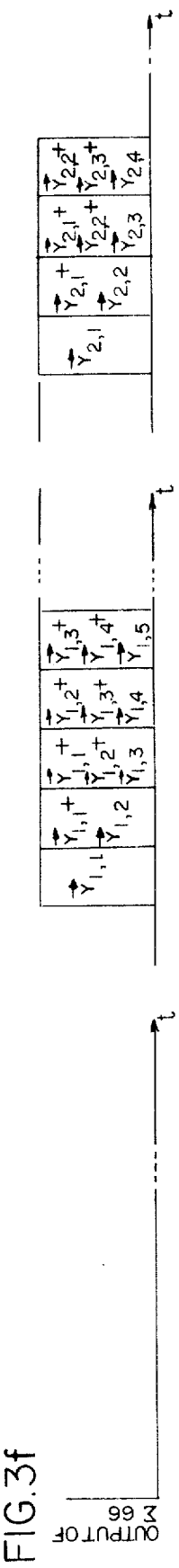
FIG.3a MTI PROCESSOR, 52 INPUT SIGNALS
FIG.3b MEMORY 52 READ/WRITE SIGNALS
FIG.3c MEMORY, 54 READ/WRITE SIGNALS
FIG.3d OUTPUT OF COMPL. MULT., 58
FIG.3e OUTPUT OF DELAY, 62
FIG.3f OUTPUT OF Σ 66

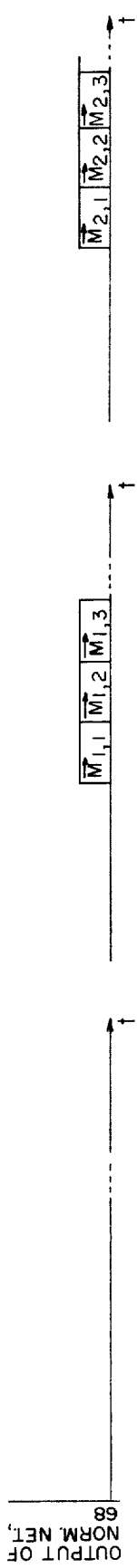
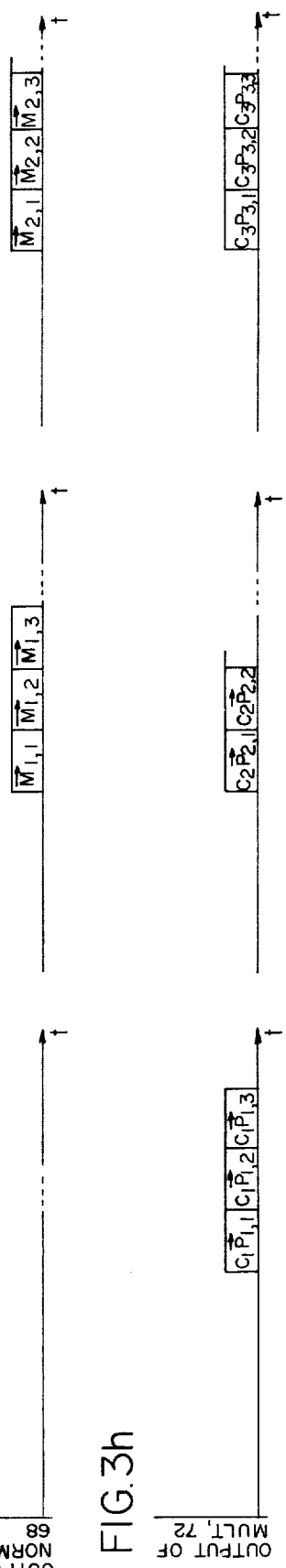
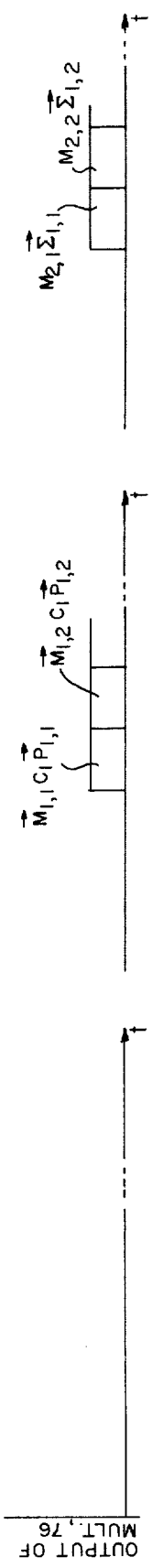
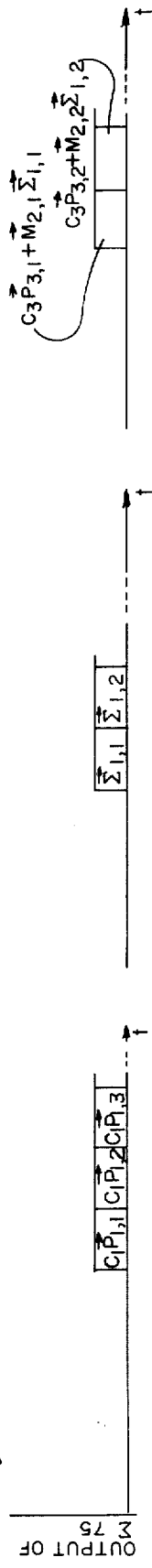
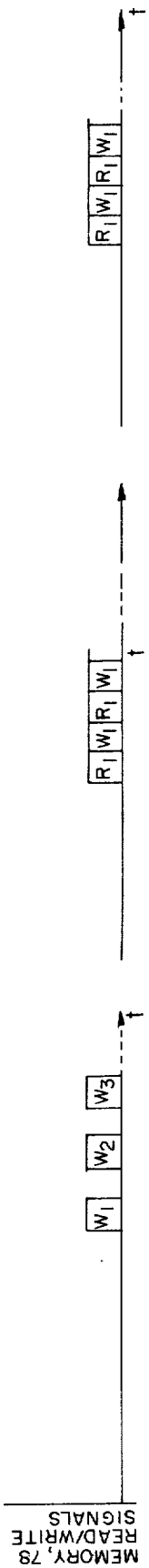
FIG.3g OUTPUT OF NORM. NET, 68
FIG.3h OUTPUT OF MULT, 72
FIG.3i OUTPUT OF MULT, 76
FIG.3j OUTPUT OF Σ, 75
FIG.3k MEMORY, 73 READ/WRITE SIGNALS

3,987,442

DIGITAL MTI RADAR SYSTEM

The invention herein described was made in the course of or under a contract or subcontract thereunder, with the Department of Defense.

BACKGROUND OF THE INVENTION

This invention relates generally to digital MTI radar systems and more particularly to adaptive systems of such type which reject reflections from moving clutter, such as rain, and retain, for detection and display, reflections from moving targets such as airplanes.

It is known in the art that, in MTI radar systems of the type contemplated herein, a reference signal is generated within the receiver of such system, such signal being coherent (that is, in phase) with each pulse in a train of successively transmitted pulses of radio frequency energy. A portion of the received energy, i.e. a reflection, resulting from each transmitted pulse is processed with the reference signal to produce a corresponding video signal during each range sweep. For convenience, the video signal so produced may be considered as a composite video signal made up of reflections from stationary objects and reflections from moving objects. The portions of the video signal made up of reflections from stationary objects are in constant phase relationship with the reference signal between successive range sweeps, whereas the portions of such video signal made up of reflections from moving objects vary in phase relationship with the reference signal between successive sweeps, the rate of change of phase being related to the Doppler velocity of the object. Therefore, by comparing the video signal of a current range sweep with the video signal of at least one previous range sweep, cancellation of the portions of such video signal resulting from stationary objects may be effected.

As is also known in the art, the moving objects referred to above may be divided into two classes: Moving clutter, such as rain, and moving targets, such as airplanes. It is generally desirable that in an MTI radar system the reflections from moving clutter together with reflections from stationary objects be rejected while reflections from the moving targets be retained. In an MTI radar system which is used for detection of airplanes expected at relatively large elevation angles the cancellation process referred to above should preferably be one which is able to "adapt" to cancel the moving clutter reflections, regardless of any changes in the Doppler velocity (within relatively wide limits) of such reflections.

In known digital MTI radar systems cancellation of moving clutter is effected by first explicitly calculating the phase difference between successive digitized video signals and thereby correcting such video signals by the calculated phase difference. While such a system may be adequate in some applications, the explicit calculation of the phase difference requires relatively extensive computation. This is so especially when, to avoid "blind" Doppler velocities in a pulsed system, the pulse repetition frequency of the system is varied.

SUMMARY OF THE INVENTION

With this background of the invention in mind it is therefore an object of this invention to provide an improved digital MTI radar system which is adapted to reject reflections from moving clutter and to retain, for detection and display, reflections from other moving targets.

This and other objects of the invention are attained generally by providing, in a radar system wherein "in phase" and "quadrature" signals are produced for each one of a series of range sweeps, such signals being phase compared with a reference signal to produce a pair of signals and wherein such pair of signals is converted into a series of input complex digital words, each one of such words corresponding to a different range cell in each one of the series of range sweeps, the improvement comprising a means for combining a portion of the series of input complex digital words of one of the series of range sweeps with a portion of the series of input complex digital words of another one of such range sweeps to produce a series of correction complex digital words, each one thereof being representative of the average Doppler velocity of returns at a different one of the range cells in a range sweep; and, canceller means for modifying each one of the input complex digital words of one of the range sweeps with a different one of the correction complex digital words to produce a series of modified complex digital words and for combining each one of the modified complex digital words with a different one of the input complex digital words of another one of the range sweeps to reject moving clutter returns and to pass returns from moving targets.

BRIEF DESCRIPTION OF THE DRAWINGS

For a more complete understanding of the invention reference is now made to the following description of the accompanying drawings, in which:

FIG. 1 is a block diagram of a coherent pulse Doppler MTI radar system according to the invention;

FIGS. 2a and 2b are vector diagrams useful in understanding the radar system of FIG. 1; and, FIGS. 3a–3k are timing diagrams useful in understanding the radar systems of FIG. 1.

DESCRIPTION OF THE PREFERRED EMBODIMENT

Referring now to FIG. 1, it should be noted first that, for convenience, a coherent pulse Doppler radar 10 has been selected to illustrate how this invention may be applied. Thus, the illustrated system includes a clock means 11, a synchronizer 12, a system trigger generator 13, a transmitter 15, a duplexer 17 and an antenna 19, each of which is conventional in construction and operation to produce, periodically, a directional beam of radio frequency energy (not shown) to illuminate objects (not shown) such as moving clutter (i.e. rain) and moving targets (i.e. airplanes) within such beam. Echo signals (not shown) from any and all objects are received by the antenna 19, and, after passing through duplexer 17, are heterodyned in a signal mixer 21 with a signal from a stable local oscillator, stalo 23. The resulting intermediate frequency signals are passed through an I.F. amplifier 25. A portion of the radio frequency energy out of the transmitted 15 is removed, by means of a directional coupler 27, and is heterodyned with the signal produced by stalo 23 in a mixer 29. The resulting signal, after appropriate filtering (not shown) is applied to a coherent oscillator, coho 31. The output signal from the latter element serves as a reference signal.

The signals at the output of the I.F. amplifier 25 are impressed on the input terminals of a pair of signal phase detectors $33_1$, $33_2$. The reference signal produced by coho 31 is here applied to phase detector $33_1$ after passing through a $+45°$ phase shifter $35_1$ and to phase detector $33_2$ after passing through a $-45°$ phase shifter $35_2$. It follows then that the phase detectors $33_1$, $33_2$ and the $+45°$ and $-45°$ phase shifters $35_1$, $35_2$ form a conventional quadrature phase detector 37 which produces an "in phase" bipolar video signal on line 39 and a "quadrature phase" bipolar video signal on line 41. The former signal will be sometimes referred to as the "real" portion of the bipolar video signal and the latter will be referred to as the "imaginary" portion of the bipolar video signal.

The signal on line 39 is fed to an analog-to-digital converter 43 (referred to hereinafter as A/D converter 43) while the signal on line 41 is fed to an analog-to-digital converter 44 (hereinafter referred to as A/D converter 44). A/D converter 43 and A/D converter 44 are preferably of conventional construction, each producing digital words, in response to clock pulses c.p. supplied to synchronizer 12. Such digital words represent the amplitude of each sampled real and imaginary portion of the signal out of the quadrature phase detector 37. [Here each digital word is shown as a 4 bit digital word; however, the number of bit accuracy may be increased or decreased without changing the inventive concepts hereinafter described.] Each corresponding real and imaginary word is combined into a single digital word, here 8 bits, and passed as a complex word to an MTI processor 45. The details of processor 45 will be described hereinafter. Suffice it to say here that such processor 45 rejects reflections from moving clutter and retains reflections from moving targets for detection and display by utilization device 47 which here is a conventional cathode ray tube display synchronized with a "sync" pulse supplied by synchronizer 12.

Before discussing the details of MTI processor 45 let us briefly consider the operation of the pulse Doppler radar 10. In operation, after each one of a series of radio frequency pulses, (i.e. $T_1, T_2 \ldots T_N$) is transmitted, a series of regularly spaced clock pulses, (c.p.'s) are passed to A/D converters 43, 44. The complex digital words produced at the output of such A/D converters 43, 44 in response to such clock pulses represent the difference in phase between the reference signal produced by coho 31 and the radar return signals produced at the output of I.F. amplifier 25 in response to such transmitted pulse. Such digital words are also related to the amplitude of the radar return signals. Each different one of such digital words in a range sweep, then, represents the relative phase difference between the reference signal and the return signal associated with objects in different range cells and also the amplitude of the return in each one of such range cells.

Let us represent the complex digital words produced at the output of A/D converters 43, 44 as vectors $$\vec{P}_{n,r}$$

(where $n$ represents the range sweep associated with transmitted pulse, $n = 1, 2 \ldots N$ and $r$ represents the range cell of such range sweep, $r = 1, 2 \ldots R$). Such vectors may be considered as having two orthogonal components, one the real component and the other the imaginary component. In particular, referring to FIG. 2a, let us consider the vector $$\vec{P}_{n,r} = |P_{n,r}| \underline{/\beta_1}$$

to represent the complex digital words produced at the outputs of A/D converters 43, 44 at a time $t_r$ after the transmission of the nth transmitted pulse $T_n$ (where $t_r$ is less than the time interval between transmitted pulses). (The range of the object reflecting the energy associated with vector $$\vec{P}_{n,r}$$

hence is at a range $R_r = (2c/t_r)$ where $c$ is the speed of light). Let us now assume that at a time $t_r$ after the next pulse (i.e. $T_{n+1}$) is transmitted the signal produced at the output of A/D converters 43, 44 may be represented as a vector $$\vec{P}_{n+1,r} = |P_{n+1,r}| \underline{/\beta_2}$$

(as shown in FIG. 2A). It should first be noted in passing that if the object at range $R_r$ were a stationary object the vectors $$\vec{P}_{n,r}$$

and $$\vec{P}_{n+1,r}$$

would be in phase, (i.e. $\theta_1 = 0°$), whereas if such object were moving the angle $\theta_1$ would be related to the Doppler velocity of the object (i.e. the Doppler velocity would be proportional to $\theta_1$ divided by the time interval between the nth and the nth + 1 transmitted pulses). It follows then that by merely subtracting the vector $$\vec{P}_{n,r}$$

from the vector $$\vec{P}_{n+1,r}$$

one could cancel the reflections from stationary objects. Further, if it were known that the object at range $R_r$ were rain, (i.e. more generally a return from moving clutter,) reflections therefrom could be cancelled by first rotating the vector $$\vec{P}_{n,r}$$

through an angle $\theta_1$ and then subtracting the rotated vector from the vector $$\vec{P}_{n+1,r}$$

It is noted, however, that in a practical application one would not know, a priori, whether the object at range $R_r$ was moving clutter or a moving target (i.e. airplane).

According to the invention, a complex digital word representative of the phase angle between the vector $$\vec{P}_{n,r}$$

and the vector $\vec{P}_{n+1,r}$ is derived by multiplying one of such vectors by the complex conjugate of the other (here the complex conjugate of the vector $$\vec{P}_{n,r} \text{ (i.e. } \vec{P}^*_{n,r} = |P_{n,r}| \underline{/-\beta_1}$$

is multiplied by the vector $$\vec{P}_{n+1,r}$$

to form a product vector $$\vec{P}_{n,r} \cdot \vec{P}^*_{n+1,r} = |P_{n,r}| |P_{n+1,r}| \angle B_1 + B_2 = \theta.$$

It is noted that, if the object at range $R_r$ were moving clutter, the amplitude of this product is very close to the average power of the two returns. It follows then that if similar product vectors were produced for objects at range cells in the vicinity of range $R_r$ (because moving clutter may be considered as an extended target and hence extending over a number of range cells) each one of the product vectors will be similar in magnitude and phase to the product vector $$\vec{P}_{n,r} \cdot \vec{P}^*_{n+1,r}$$

In contradistinction, however, the reflection from a moving target, such as an airplane, will normally be detected in only a single cell. Therefore, let us consider the returns at ranges $r-1$, $r$, $r+1$ and further let us assume that there is moving clutter at ranges $r-1, r, r+1$ and an aircraft at range $r+2$. It is first noted, (referring also to FIG. 2B) for reasons discussed above, the phase angles associated with the clutter in each one of a series of range cells will all approximately be equal, here say approximately equal to $\theta_1$). The sum thereof may be represented as a vector $\vec{P}_{sum}$, such vector also having an angle $\theta_1$. It is next noted that by converting such vector to a unit vector the angle of such unit vector will also be $\theta_1$. It is still further noted that the phase angle associated with the target (i.e. $\alpha$) is considerably different from the former phase angle, $\theta_1$, because in general the aircraft would not be at the same velocity as rain. It follows then that by adding the product vectors over a number of range cells $r-1$, $r+1$, $r+2$ the effect of a moving target, i.e. the airplane, will be reduced because in the example shown in FIG. 2B the contribution from the vector associated with the target is relatively small as compared to the total contribution from all the moving clutter. According to the invention a unit vector, $$\vec{M}_{n,r}$$

is, as will be described hereinafter, developed. Such unit vector is equal to the sum of the product vectors at range cells $r-1, r, r+1, r+2$ divided by the magnitude of the sum of the vectors. Hence such unit vector $$\vec{M}_{n,r}$$

may be considered as representing the average moving clutter Doppler velocity over range cells $r-1$, $r,r+1$, $r+2$ because such unit vector will have a phase angle approximately equal to the average phase angle associated with such clutter, here let us say the phase angle, $\theta_1$. Therefore, $$\vec{M}_{n,r} = 1 \angle \theta_1.$$

Further, because, as noted above, the product vectors have a magnitude related to the average power in the returns, relatively large clutter returns will contribute to a relatively greater extent than smaller clutter returns in forming the unit vector $$\vec{M}_{n,r}$$

as is generally desired.

Referring now again to FIG. 2A it is now evident that, in accordance with the above assumptions, the vector $$\vec{P}_{n,r}$$

may be rotated through the phase angle associated with the average moving clutter Doppler velocity (i.e. the phase angle $\theta_1$) by first multiplying, in a complex multiplier, the vector $\vec{P}_{n,r}$ by the unit vector $$\vec{M}_{n,r}.$$

The result is a vector $$(\text{i.e. } \vec{P}_{n,r} \cdot \vec{M}_{n,r} = |P_{n,r}| \angle B_1 + \theta_1 = B_2)$$

"rotated" to the angle $B_2$ and hence is orientated codirectionally with the vector $$\vec{P}_{n+1,r}.$$

Therefore, by subtracting the "rotated" vector from the vector $$\vec{P}_{n+1,r}$$

the effect of moving clutter at the range cell r is effectively cancelled.

Referring again to FIG. 1 the complex digital words produced at the output of A/D converters 43, 44 are passed to a unit vector calculator section 48 and a canceller section 50 of MTI processor 45. The unit vector calculator section 48 includes: A random access memory 52, having its data input terminal coupled to A/D converters 43, 44; and, a buffer memory 54, here also a random access memory, having its data input terminal coupled to the data output terminal of memory 52, as shown. Memories 52, 54 have read enable lines, $R_{52}$, $R_{54}$, respectively, write enable lines $W_{52}$, $W_{54}$, respectively and address lines $A_{52}$, $A_{54}$, respectively. Such lines $R_{52}$, $R_{54}$, $W_{52}$, $W_{54}$, $A_{52}$, $A_{54}$ are coupled to synchronizer 12, as shown. The output terminal of buffer memory 54 is coupled to a complex conjugate network 56. Such complex conjugate network 56 is of conventional design to couple the "real portion" of a complex digital word read from buffer memory 52 directly to its output terminal while coupling the "imaginary portion" of such complex digital word to such terminal through inverters. Such a process may be represented as follows:

If $W_i = A + jB$ where $W_i$ is the complex digital word applied to the input terminals of the conjugate network 56;

A is the real portion of such word;

B is the imaginary portion of such word $j = \sqrt{-1}$;

Then, $W_o = A - jB = W_i^*$ where $W_o$ is the complex digital word at the output terminals of such conjugate network 56 (i.e. $W_o = W_i^*$).

A complex multiplier 58, of any conventional design, is included to multiply the complex digital word produced at the output terminal of conjugate network 56 with the complex digital word applied to random access memory 52. As will be shown later, the complex multiplier 58 multiplies the digital words associated with a range sweep by the complex conjugate of the digital words at corresponding range cells of a previous range sweep. To put it another way, complex multiplier 58 multiplies the vectors:

$$\vec{P}_{2,1}, \vec{P}_{2,2}, \vec{P}_{2,3} \ldots \vec{P}_{2,N} \ldots$$

with the complex conjugate of the vectors $$\vec{P}_{1,1}, \vec{P}_{1,2}, \vec{P}_{1,3} \ldots \vec{P}_{1,N}$$

as described above to form the product vectors:

$$|\vec{P}^*_{1,1} \cdot \vec{P}_{2,1}|; |\vec{P}^*_{1,2} \cdot \vec{P}_{2,2}|; |\vec{P}^*_{1,3} \cdot \vec{P}_{2,3}|; \ldots |\vec{P}^*_{1,N} \cdot \vec{P}_{2,N}|.$$

The product vectors are passed through an averaging network 60. Such averaging network 60 includes a differencing network 62, a delay network 64 (here a three stage shift register) and a summing network 66. As will be shown later, the output of the summing network 66 will be a complex digital word representative of the sum of the product vectors of three adjacent range cells (i.e., for example:

$$|\vec{P}^*_{n,r} \cdot \vec{P}_{n+1,r}| + |\vec{P}^*_{n,r+1} \cdot \vec{P}_{n+1,r+1}| + |\vec{P}^*_{n,r+2} \cdot \vec{P}_{n+1,r+2}|).$$

(In many applications it may be desired to use more than three range cells to produce better averaging). The output of the averaging network 60 is fed to a normalizing network 68. Here such network 68 is of any conventional design and includes a conventional divider circuit for dividing the complex digital word or vector applied to such network 68 (i.e. Re + jIm) by the absolute value of such digital word or vector (i.e. $|\sqrt{Re^2+Im^2}|$). The output of the normalizing network 68 is a complex digital word representative of the average Doppler velocity associated with the returns from the three adjacent range cells $r$, $r+1$, $r+2$. (That is, such output is a complex digital word representative of the unit vector $$\vec{M}_{n,r}$$

referred to above).

Canceller section 50 is here configured as a third order MTI canceller (however, other order cancellers may be selected); that is, such canceller operates on three successive range sweeps (i.e. $n$, $n+1$, $n+2$) in the following manner: Considering range cell n, the canceller section 50 produces an output signal (to utilization device 47) equal to output =

$$C_3\vec{P}_{n+2,r} \cdot (C_2\vec{P}_{n+1,r} + C_1\vec{P}_{n,r} \cdot \vec{M}_{n,r}) \vec{M}_{n+1,r}$$

where:
 $C_1 = -1$;
 $C_2 = +2$;
 $C_3 = -1$;

$$\vec{M}_{n,r}$$

is the unit vector calculated from range sweeps $n$ and $n+1$; and $$\vec{M}_{n+1,r}$$

is the unit vector calculated from range sweeps $n+1$ and $n+2$.

(A little thought will make it apparent that if the pulses of radio frequency energy are transmitted at regularly spaced time intervals $$\vec{M}_{n,r} = \vec{M}_{n+1,r} = \vec{M}_{n+2,r}$$

etc., whereas if such pulses are staggered $$\vec{M}_{n,r} \neq \vec{M}_{n+1,r} \neq \vec{M}_{n+2,r}$$

etc..)

Canceller section 50 includes: A delay network 70, here a three c.p. delay equivalent to delay network 64; a complex multiplier 72, fed by delay network 70 and a random access memory 74; a summing network 75 fed by multiplier 72 and a complex multiplier 76; a random access memory 78 having its data input terminal coupled to the output of summer 75 and having its data output terminal coupled to the input terminal of complex multiplier 76, as shown. The output of normalizing network 68 is also coupled to complex multiplier 76. Read enable line $R_{78}$, write enable line $W_{78}$ and address line $A_{78}$ are used to couple memory 78 to synchronizer 12 to provide such memory 78 with write enable, read enable, and memory address signals as will be described hereinafter.

Referring now also to the timing diagrams in FIGS. 3a–3k, let us consider the returns from three transmitted pulses, $T_1$, $T_2$, $T_3$, such transmitted pulses being represented in FIG. 3a in phantom, as shown. The complex digital words fed to MTI processor 45 are shown as : Vectors $$\vec{P}_{1,1}, \vec{P}_{1,2}, \ldots \vec{P}_{1,N}; \vec{P}_{2,1}, \vec{P}_{2,2} \ldots \vec{P}_{2,N};$$

and, $$\vec{P}_{3,1}, \vec{P}_{3,2} \ldots \vec{P}_{3,N};$$

etc. In response to the first clock pulse after the transmission of the first pulse $T_1$, synchronizer 12 sends a write enable signal on line $W_{52}$ to memory 52. During one-half the time interval between such first clock pulse and the next following clock pulse, such synchronizer 12 also provides a signal on address line $A_{52}$ to address location 1 of such memory 52. In response to the signals on lines $W_{52}$ and $A_{52}$ the vector $$\vec{P}_{1,1}$$

becomes stored in memory 52 at location 1. This is indicated in FIG. 3b by the designation of time interval $W_1$. During the second half of the time interval between the first clock pulse and the second clock pulse synchronizer 12 provides an enabling signal on lines $R_{52}$ and $W_{54}$ and address location 1 signals on lines $A_{52}$ and $A_{54}$. In response to such signals the contents in location 1 of memory 52 (i.e.

$$\vec{P}_{1,1})$$

is read and becomes stored in location 1 of buffer 54. This is indicated in FIG. 3b as the interval $R_1$ and in FIG. 3c e as the interval $W_1$. Equivalent operation occurs for successive clock pulses; however, the address locations increment by 1 for each c.p. . It follows that just prior to the second transmitted pulse, $T_2$, the buffer memory 54 has stored in location 1-R vectors $$\vec{P}_{1,1} - \vec{P}_{1,N},$$

respectively.

Considering now the processing which occurs during the second range sweep in response to the first clock pulse after the pulse $T_2$ is transmitted synchronizer 12 produces, during the first half of the interval between such first c.p. and the second c.p., an enabling signal on line $W_{52}$ and an address 1 on line $A_{52}$ whereby vector $\vec{P}_{2,1}$
becomes stored in location 1 of memory 52. Also, during such first half of such interval synchronizer 12 produces a read enable signal on line $R_{54}$ and an address location 1 signal on line $A_{54}$ whereby the vector stored in location 1 of buffer memory 54 (i.e.

$\vec{P}_{1,1}$)

is read therefrom and passes through conjugate network 56 (where it is transformed to the complex conjugate thereof, i.e.

$\vec{P}_{1,1}^-$)

and becomes applied to complex multiplier 58. At this same time interval the vector $\vec{P}_{2,1}$ also is applied to complex multiplier 58. It follows then that during the interval between the first clock pulse and the second clock pulse (such c.p.'s being those produced after the transmission of pulse $T_2$), the product vector $\vec{P}_{1,1}^- \cdot \vec{P}_{2,1} = \vec{Y}_{1,1}$ is produced at the output of complex multiplier 58. The process continues for subsequent c.p.'s and it follows then that product vectors $\vec{Y}_{1,2}, \vec{Y}_{1,3} \ldots \vec{Y}_{1,R}$ are produced sequentially at the output of complex multiplier 58 just prior to clock pulses 3, 4, 5 ... $R^{th}$, respectively, as indicated in FIG. 3d. The product vectors (i.e.

$\vec{Y}_{1,1}, \vec{Y}_{1,2}, \vec{Y}_{1,3} \ldots$)

produced by complex multiplier 58 are passed to the summing network 66 through differencing network 62 through two paths, one path being a direct path and the other path including delay network 64. Because of delay network 64 the product vectors $\vec{Y}_{1,1}, \vec{Y}_{1,2} \ldots$ are applied to differencing network 62 beginning at the fourth clock pulse after the transmission of pulse $T_2$ as indicated in FIG. 3e. It follows then that the output of summing network 66 will produce, at the end of the first clock pulse after transmission of pulse $T_2$, the product vector $\vec{Y}_{1,1}$ and at the end of the second clock pulse the sum of the product vectors $\vec{Y}_{1,1}$ and $\vec{Y}_{1,2}$ (i.e. $\vec{Y}_{1,1} + \vec{Y}_{1,2}$)

and at the end of the third clock pulse the product vector sum $\vec{Y}_{1,1} + \vec{Y}_{1,2} + \vec{Y}_{1,3}$.

At the end of the fourth clock pulse the product vector $\vec{Y}_{1,1}$ will be produced at the output of delay network 64 (see FIG. 3e) and therefore the output of summing network 66 at the end of said fourth clock pulse will be the product vector sum $\vec{Y}_{1,2} + \vec{Y}_{1,3} + \vec{Y}_{1,4}$ as indicated in FIG. 3f. It follows then that the normalizing network 68 will produce, beginning at the end of the third clock pulse after transmission of pulse $T_2$ the unit vectors $\vec{M}_{1,1}; \vec{M}_{1,2}; \vec{M}_{1,3}$ successively as indicated in FIG. 3g. Continuing the above in connection with the third range sweep, the unit vectors $M_{2,1}, M_{2,2}, \ldots$ will be produced at the output of the normalizing network 68 beginning at the end of the third clock pulse of transmission of pulse $T_3$ (as indicated in FIG. 3g).

Now considering the operation of canceller network 50 let us refer also to FIGS. 3a and 3k. Because of delay network 70 vectors $\vec{P}_{1,1}, \vec{P}_{1,2}, \vec{P}_{1,3}$ ... start being produced at the output of such network at the fourth clock pulse after transmission of pulse $T_1$. At such time synchronizer 12 transmits to memory 74 to read enable signal on line $R_{74}$ and an address location 1 signal on line $A_{74}$. In response to such signals location 1 of such memory is read. At such location such memory has stored therein the constant $C_1$. Therefore, the vectors $C_1\vec{P}_{1,1}; C_1\vec{P}_{1,2}; C_1\vec{P}_{1,3} \ldots C_1\vec{P}_{1,R}$ pass to summing network 75, successively, beginning after the fourth clock pulse, as indicated in FIG. 3h. During the time interval such vectors are applied to summing network 75 the output of normalizing network 68 is zero and hence the output of multiplier 76 is also zero. Still further, beginning after the fourth clock pulse synchronizer 12 produces, during the last half of the period between successive clock pulses, a write enable signal on line $^W78$ and address locations 1, 2, 3 ... R signals on line $A_{78}$ so that vectors $C_1\vec{P}_{1,1}; C_1\vec{P}_{1,2} \ldots C_1\vec{P}_{1,R}$ become stored in such memory at locations 1-R synchronously as such vectors are produced at the output of summing network 75. It follows then that prior to the transmission of the pulse $T_2$, the vectors $C_1\vec{P}_{1,1}; C_1\vec{P}_{1,2} \ldots C_1\vec{P}_{1,R}$ become stored in locations 1, 2, ... R, respectively of memory 78 (see FIG. 3k).

Considering now the processing of canceller network 50 during the second range sweep it is first noted that during such sweep synchronizer 12 produces a read enable signal on line $R_{78}$ and an address location 2 signal on line $A_{78}$. In response to such signals the consant $C_2$ is read from location 2 of memory 78. It follows then that the vectors $C_2\vec{P}_{2,1}; C_2\vec{P}_{2,2}; C_2\vec{P}_{2,3} \ldots ; C_2\vec{P}_{2,R}$ are produced at the output of multiplier 72 beginning after the third clock pulse of such range sweep, as indicated in FIG. 3h. Further, during the first half of the interval between successive clock pulses, a read enable signal is supplied by synchronizer 12 to memory 78 via line $R_{78}$, and also address line $A_{78}$ has successively applied thereto during such time interval address location 1, 2, 3 ... R signals respectively as indicated in FIG. 3k. It follows then that the vectors $C_2\vec{P}_{2,1} + \vec{M}_{1,1} C_1\vec{P}_{1,1} = \vec{Z}_{1,1};$
$C_2\vec{P}_{2,2} + \vec{M}_{1,2} C_1\vec{P}_{1,2} = \vec{Z}_{1,2}; \ldots$
$C_2\vec{P}_{2,R} + \vec{M}_{1,R} C_1\vec{P}_{1,R} + \vec{Z}_{1,R}$ will be produced at the output of summing network 75 successively beginning at the fourth clock pulse of such second sweep as indicated in FIGS. 3*i* and 3*j*. Such vectors $$\vec{\Sigma}_{1,1}, \vec{\Sigma}_{1,2} \ldots \vec{\Sigma}_{1,R}$$

are stored in memory 78 in response to write enable signals on line $W_{78}$ and address signals on line $A_{78}$, such signals being supplied by synchronizer 12. In response to such write enable signals and address signals such vectors $$\vec{\Sigma}_{1,1} \ldots \vec{\Sigma}_{1,R}$$

become stored in locations 1-R of memory 78 respectively, as indicated in FIG. 3*k*.

Considering now the processing in canceller network 50 during the third range sweep it is first noted that during such range sweep synchronizer 12 produces a read enable signal on line $R_{78}$ and an address location 3 signal on line $A_{78}$. In response to such signals the constant $C_3$ is read from such memory 78. It follows then that the vectors $$C_3\vec{P}_{3,1}; C_3\vec{P}_{3,2} \ldots ; C_3\vec{P}_{3,R}$$

are produced at the output of multiplier 72 successively beginning after the third clock pulse of such range sweep, as indicated in FIG. 3*h*. Further, during the first half of the time interval between successive clock pulses a read enable signal is supplied by synchronizer 12 to memory 78 via line $R_{78}$, and also address line $A_{78}$ has successively applied thereto during such time interval address location 1, 2, 3...R signals respectively as indicated in FIG. 3*k*. It follows then that the vectors:

$$C_3\vec{P}_{3,1} + \vec{M}_{2,1}\vec{\Sigma}_{1,1} = C_3\vec{P}_{3,1} + \vec{M}_{2,1}(C_2\vec{P}_{2,1} + \vec{M}_{1,1}C_1\vec{P}_{1,1});$$

$$C_3\vec{P}_{3,2} + \vec{M}_{2,2}\vec{\Sigma}_{1,2} = C_3\vec{P}_{3,2} + \vec{M}_{2,2}(C_2\vec{P}_{2,2} + \vec{M}_{1,2}C_1\vec{P}_{1,2});$$

$$\ldots;$$

$$C_3\vec{P}_{3,R} + \vec{M}_{2,R}\vec{\Sigma}_{1,R} = C_3\vec{P}_{3,R} + \vec{M}_{2,R}(C_2\vec{P}_{2,R} + \vec{M}_{1,R}C_1\vec{P}_{1,R}).$$

will be produced at the output of summing network 75 successively, beginning at the fourth clock pulse of such range sweep. Such vectors are passed to utilization device 74 for display in response to SYNC. pulses supplied to such utilization device by synchronizer 12.

Having described a preferred embodiment of the invention, numerous variations, substitutions and equivalents will now suggest themselves to those of skill in the art, all of which may be effected without departing from the spirit and scope of the appended claims.

What is claimed is:

1. In a radar system wherein "in phase" and "quadrature" signals are produced for each one of a series of range sweeps, such signals being phase compared with a reference signal to produce a pair of signals and wherein such pair of signals is converted into a series of complex digital words, each one of such words corresponding to a different one of a number of range cells in each one of the series of sweeps, the improvement comprising:

a. means for combining a portion of the series of complex digital words of one of the series of range sweeps with a portion of the series of complex digital words of another one of such range sweeps to produce a series of correction complex digital words, each one thereof being representative of the average Doppler velocity of returns at a different one of the range cells;

b. canceller means including: means for modifying each one of the input complex digital words of one of the range sweeps with a corresponding one of the correction complex digital words to produce a series of modified complex digital words; and means for combining each one of the modified complex digital words with a different one of the input complex digital words of another one of the range sweeps to reject moving clutter returns and to pass moving target returns.

2. The improvement recited in claim 1 wherein the combining means includes for complex multiplying each one of the complex digital words of one of the range sweeps by the complex conjugate of corresponding ones of the series of complex digital words of another one of the range sweeps to form a series of product vectors.

3. The improvement recited in claim 2 wherein the combining means includes means for summing a predetermined number of the product vectors.

4. The improvement recited in claim 3 wherein the combining means includes means for dividing the summed product vectors by the magnitude of such summed vectors thereby forming one of the series of correction complex digital words.

* * * * *